(12) United States Patent
Mohamed

(10) Patent No.: US 11,290,502 B2
(45) Date of Patent: Mar. 29, 2022

(54) TERRESTRIAL TRUNKED RADIO GATEWAY

(71) Applicant: SAPURA SECURED TECHNOLOGIES SDN BHD, Kuala Lumpur (MY)

(72) Inventor: Muhd Nordin bin Mohamed, Kuala Lumpur (MY)

(73) Assignee: SAPURA SECURED TECHNOLOGIES SDN BHD, Kuala Lumpur (MY)

( * ) Notice: Subject to any disclaimer, the term of this patent is extended or adjusted under 35 U.S.C. 154(b) by 26 days.

(21) Appl. No.: 17/004,825

(22) Filed: Aug. 27, 2020

(65) Prior Publication Data

US 2021/0075830 A1 Mar. 11, 2021

(30) Foreign Application Priority Data

Sep. 5, 2019 (MY) .......................... PI 2019005142

(51) Int. Cl.

| H04L 29/06 | (2006.01) |
|---|---|
| H04L 65/1033 | (2022.01) |
| G10L 19/12 | (2013.01) |
| H04L 12/66 | (2006.01) |
| H04L 65/10 | (2022.01) |
| H04L 65/65 | (2022.01) |

(Continued)

(52) U.S. Cl.
CPC ............ *H04L 65/104* (2013.01); *G10L 19/12* (2013.01); *H04L 12/66* (2013.01); *H04L 65/1006* (2013.01); *H04L 65/608* (2013.01); *H04L 67/42* (2013.01); *H04M 7/006* (2013.01); *G10L 2019/0016* (2013.01)

(58) Field of Classification Search
CPC . G10L 19/12; G10L 2019/0016; H04L 12/66; H04L 65/1006; H04L 65/103; H04L 65/104; H04L 65/1063; H04L 65/403; H04L 65/608; H04L 67/42; H04M 7/006; H04W 88/16

See application file for complete search history.

(56) References Cited

U.S. PATENT DOCUMENTS

| 2009/0239527 A1* | 9/2009 | Forsten | .................... | H04W 4/10 |
| | | | | 455/426.1 |
| 2012/0155549 A1* | 6/2012 | Oh | .......................... | H04N 7/183 |
| | | | | 375/240.25 |
| 2016/0323728 A1* | 11/2016 | Thakur | ............... | H04L 65/1006 |

* cited by examiner

*Primary Examiner* — Khaled M Kassim
(74) *Attorney, Agent, or Firm* — Maschoff Brennan

(57) ABSTRACT

A terrestrial trunked radio gateway includes a conference server configured to perform switching of audio input from a voice over internet protocol (VoIP) phone. The terrestrial trunked radio gateway further includes a pulse code modulation (PCM) driver that inserts an algebraic codebook excited linear prediction (ACELP) voice data for transmission to tetra network. A user agent server (UAS) or a user agent client (UAC) connects to the VoIP phone via a VoIP network. An access net gateway (AGW) functions as an access net common application programming interface (ACAPI) client communicating with an access net common application programming interface (ACAPI) server. The terrestrial trunked radio gateway works as a signaling gateway and allow communication between the VoIP phone and a mobile radio terminal. The VoIP phone uses a built-in algebraic codebook excited linear prediction (ACELP) codec to convert voice captured into the ACELP formulated data before transferring to tetra gateway.

10 Claims, 2 Drawing Sheets

(51) Int. Cl.
*H04L 67/01* (2022.01)
*H04M 7/00* (2006.01)
*G10L 19/00* (2013.01)

TERRESTRIAL TRUNKED RADIO GATEWAY

FIELD OF THE INVENTION

Embodiments of the present invention, generally relate to communication systems, and in particular relate to terrestrial trunked radio gateway.

BACKGROUND

When public emergency incidents such as accidents, natural disasters, or wars occur, responding appropriately to these incidents can save many lives; and can prevent damage. Thus, situations that require effective and quick action demand, then officials need to be equipped with dependable public safety communications technology such as TETRA (Terrestrial Trunked Radio) system. The Tetra system is a mobile communications system that supports both direct communication between mobile terminals, and trunked communications modes. In a Tetra system, communication via the Tetra network infrastructure is referred to as trunked mode operation (TMO), and communication between mobile terminals independently of the trunked mode operation network is known as direct mode operation. In a tetra system, a given mobile terminal can typically be operated either in direct mode or in trunked mode, for example at the choice of the user. Further, tetra systems also provide an interconnection of services (such as calls and/or short data messages) between two or more TETRA terminals, and allow the terminals to communicate with each other even if they are each beyond the radio range of the other.

However, conventional tetra systems suffer from many disadvantages. For example, the conventional tetra systems require transcoding function that involves converting speech digital code from one to another code in the gateway. The problem is that transcoding in the conventional methods introduced undesired effects on the speech quality.

Therefore, there is a need for an improved terrestrial trunked radio gateway which solves above disadvantage associated with the conventional methods.

SUMMARY

According to an aspect of the present disclosure, a terrestrial trunked radio gateway (102) is provided herein. The terrestrial trunked radio gateway (102) includes a conference server (114) configured to perform switching of audio input from a voice over internet protocol (VoIP) phone (104). The terrestrial trunked radio gateway (102) further includes a pulse code modulation (PCM) driver (116) configured to insert an algebraic codebook excited linear prediction (ACELP) voice data for transmission to tetra network (106). The terrestrial trunked radio gateway (102) further includes a user agent server (UAS)/a user agent client (UAC) (118) configured to connect to the VoIP phone (104) via a VoIP network (122). The terrestrial trunked radio gateway (102) further includes an access net gateway (AGW) (120) configured to function as an access net common application programming interface (ACAPI) client communicating with an access net common application programming interface (ACAPI) server 109. The terrestrial trunked radio gateway (102) is configured to work as signaling gateway and allow communication between the VoIP phone (104) and a mobile radio terminal (112). The VoIP phone (104) is configured to use a built-in algebraic codebook excited linear prediction (ACELP) codec to convert voice captured into the ACELP formulated data before transferring to tetra gateway (102).

The preceding is a simplified summary to provide an understanding of some aspects of embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

To facilitate understanding, like reference numerals have been used, where possible, to designate like elements common to the figures.

DETAILED DESCRIPTION

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Figure 1:
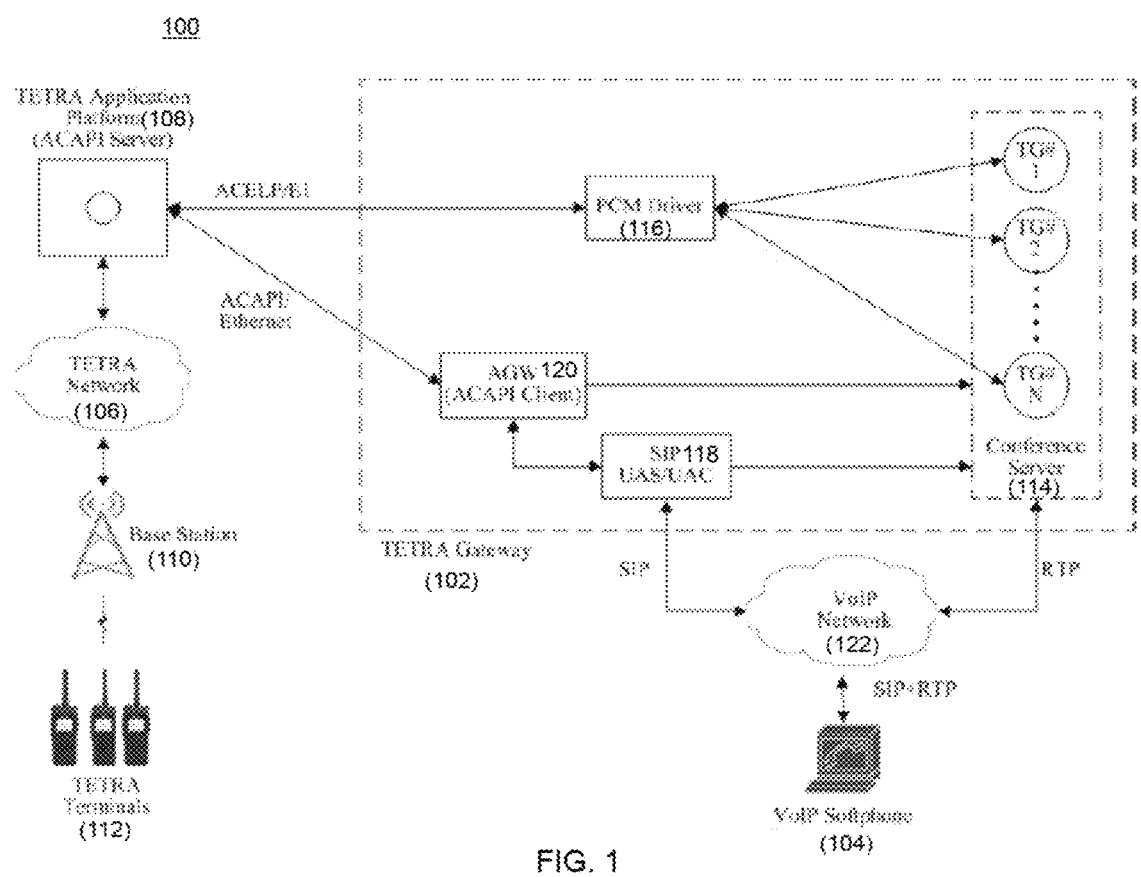
FIG. 1 is a block diagram depicting a tetra gateway interfacing with a VoIP phone over a tetra network, according to an embodiment of the present invention.

FIG. 1 illustrates an exemplary network environment 100 where various embodiments of the present invention may be implemented. In an embodiment, the network environment 100 includes a terrestrial trunked radio gateway (hereinafter called as "tetra gateway") 102, a voice over internet protocol (VoIP) softphone 104, a tetra network 106, a tetra application platform 108, a base station 110, and tetra terminals 112, as shown in FIG. 1. The tetra application platform 108 further includes access net common application programming interface (ACAPI) server.

According to an embodiment of the present invention, the terrestrial trunked radio gateway (tetra gateway) 102 is configured to allow communication between applications based phone (for example, softphone 104) and terrestrial trunked radio professional mobile radio terminal 112, as shown in FIG. 1. In an embodiment, the tetra gateway 102 is configured to enable a plurality of services to VoIP enabled softphone 104, including individual call (duplex, simplex), group call, groups short data service (SDS), and individual short data service (SDS). Those skilled in the art will appreciate that a duplex method may include 'half-duplex' communications, where conversation alternates from one direction to the other, or 'duplex' communications, where conversation can simultaneously flow in both directions.

Further, the messages exchanged between the terrestrial trunked radio gateway 102, tetra mobile terminals 112, and the VoIP softphone 104 can comprise any suitable message format and protocol capable of communicating the information necessary for the terrestrial trunked radio gateway 102 to provide a plurality of services to softphone 104, including individual call (duplex, simplex), group call, groups short data service (SDS), and individual short data service (SDS).

In an embodiment of the present invention, the VoIP (voice over internet protocol) softphone 104 may be a computing device. In operation, a user of the VoIP softphone 104 may access the terrestrial trunked radio gateway 102 to receive multiple services including individual call (duplex, simplex), group call, groups short data service (SDS), and individual short data service (SDS). The VoIP softphone 104 includes a processor and a memory. Further, the memory may comprise suitable logic, circuitry, and/or interfaces that may be operable to store a machine readable code and/or a computer program with at least one code section executable by the processor.

Further, according to an embodiment of the present invention, the tetra gateway 102 includes a conference server 114, a pulse code modulation (PCM) driver 116, a user agent server (UAS)/a user agent client (UAC) 118, and an access net gateway (AGW) 120. Further, in an embodiment, the tetra gateway 102 is connected with the softphone 104 via a VoIP network 122, as shown in FIG. 1.

In an embodiment, the conference server 114 is configured to function as voice server mixing and switching of all the audio from the voice over internet protocol (VoIP) phones and tetra transceiver (not shown in figure). Further, in an embodiment, the PCM driver 116 is configured to insert the algebraic codebook excited linear prediction (ACELP) voice data into E1 line for transmission to tetra network 106. The PCM driver 116 is further configured to extract the algebraic codebook excited linear prediction (ACELP) voice received from the tetra network 106 for the transmission to the VoIP network 122.

Further, in an embodiment, the access net gateway (AGW) 120 is configured to function as access net common application programming interface (ACAPI) client communicating with access net common application programming interface (ACAPI) server 109. In an embodiment, the ACAPI server 109 is provided on the tetra application platform (TAP) 108. The access net gateway (AGW) 120 is configured to perform tetra registration with the network, call establishment (individual and group call) and short data service (SDS).

Further, in an embodiment, the user agent server/user agent client (UAS/UAC) 118 is connected to the VoIP softphone 104 via the VoIP network 122. In an embodiment, the user agent server/user agent client (UAS/UAC) 118 is configured to handle VoIP call setup and disconnection of the system.

Further, in an embodiment, the communication protocol includes session initiation protocol and real time protocol, as shown in FIG. 1. The session initiation protocol (SIP) is configured to work in conjunction with other application layer protocols to control multimedia communication sessions over the internet. The real time protocol (RTP) is configured to insert algebraic codebook excited linear prediction (ACELP) voice data into E1 line for transmission to tetra network 106. The real time protocol (RTP) is further configured to extract the ACELP voice received from the tetra network 106 for transmission to the VoIP network 122.

In an embodiment, the access net common application programming interface (ACAPI) is configured to provide comprehensive access to communication services, data services and features of the access net private mobile radio (PMR) system. Further, the Application programming interface (API) may be used by the softphone 104 to enable an application request to the tetra gateway 102 services.

According to an embodiment of the present invention, the tetra gateway 102 is configured to work as a signaling gateway. In an embodiment, the tetra gateway 102 is configured to convert the session initiation protocol (SIP) into algebraic codebook excited linear prediction (ACAPI) protocol. Further, the tetra gateway 102 is configured to convert the ACAPI protocol into SIP protocol. In an embodiment, the VoIP softphone 104 is configured to use a built-in ACELP codec to convert voice captured by the softphone terminal mic into an ACELP formulated data before transferring it to tetra gateway 102 via VoIP network 122. Further, in an embodiment, the VoIP softphone 104 is configured to use a built-in ACELP codec to convert the ACELP formulated data received by the softphone terminal from the tetra gateway 102 into voice before receiving it via VoIP network 122.

Figure 2:
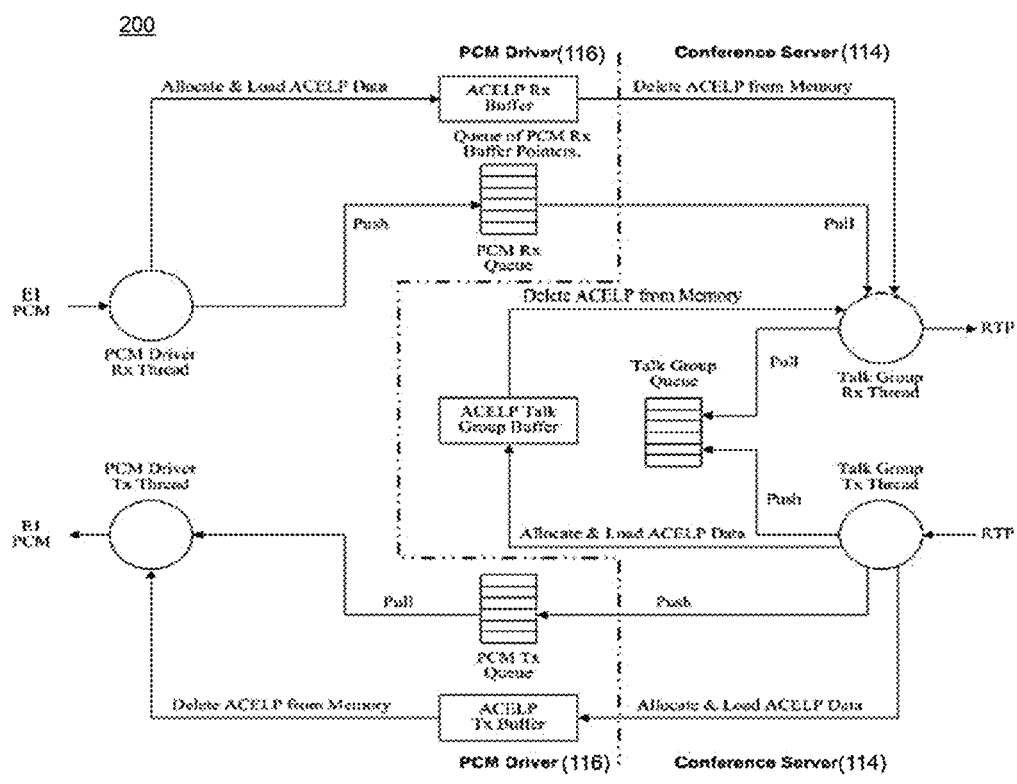
FIG. 2 depicts operation of a tetra gateway, according to an embodiment of the present invention.

FIG. 2 depicts operation of tetra gateway 102, according to an embodiment of the present invention. The tetra gateway 102 includes the conference server 114, the pulse code modulation (PCM) driver 116, the user agent server (UAS)/a user agent client (UAC) 118, and the access net gateway (AGW) 120.

In an embodiment, the access net gateway 120 includes multiple software threads or modules, for example, PCM driver, and group talk. In an embodiment, the modules (114) are instructions stored in the memory. Those skilled in the art will appreciate that each of these PCM driver and talk group modules consists of transmitting and receiving thread.

According to an embodiment of the present invention, during call, the software threads of the access net gateway 120 are configured to handle both transmitting and receiving function of real time protocol (RTP) packets. Further, for a group call (in half duplex), either transmitting or receiving thread is active at one time depending on direction of the call. Further, for individual call (in full duplex), both transmitting and receiving thread are active at same time during the call.

Further, as shown in FIG. 2, talk group queues inside the conference server 114 are configured to receive a plurality of requests from the softphone 104 over real time protocol. In an embodiment, the conference server 114 may store various incoming requests from the VoIP softphone 104 in queues, based on first come first serve criteria. Further, the PCM driver 116 is configured to pull these requests. Once a request has been gone to the PCM driver 116, it may be deleted from the queues of the conference server 114.

Further, in an embodiment, the PCM driver 116 is configured to insert the algebraic codebook excited linear prediction (ACELP) voice data into E1 line for transmission to tetra network 106. Further, the access net gateway (AGW) 120 is configured to function as ACAPI client communicating with ACAPI server. Further, the requests may be sent to the tetra terminals 112 via the tetra network 106 and the base station 110.

The PCM driver 116 is further configured to extract the algebraic codebook excited linear prediction (ACELP) voice received from the tetra network 106 for the transmission to the VoIP network 122. Further, the PCM driver 116 is configured to push these requests to the conference server 114. The conference server 114 is configured to send the requests to the VoIP softphone 104 via the real time protocol, as shown in FIG. 2.

The terrestrial trunked radio gateway 102 advantageously provides increasing voice quality at both ends of communication link, by implementing transcoding function in the softphone 104. Those skilled in the art will appreciate that the terrestrial trunked radio gateway 102 eliminates transcoding function from the gateway that involve converting speech digital code from one to another in the gateway, and was responsible for some undesired effects on the speech quality. Further, the terrestrial trunked radio gateway 102 advantageously provides multiple protocols like session initiation protocol (SIP) and real time protocol (RTP) to the VoIP enabled phones. Furthermore, the tetra gateway 102 provides a communications system in which terminals of the system can communicate with each other via a network infrastructure of the system and/or in a direct mode of operation in which terminals can communicate with each other without the communication passing via the network infrastructure.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A terrestrial trunked radio gateway comprising:
   a conference server configured to perform switching of audio input from a voice over internet protocol (VoIP) phone,
   a pulse code modulation (PCM) driver configured to insert an algebraic codebook excited linear prediction (ACELP) voice data for transmission to tetra network,
   a user agent server (UAS)/a user agent client (UAC) configured to connect to the VoIP phone via a VoIP network, and
   an access net gateway (AGW) configured to function as an access net common application programming interface (ACAPI) client communicating with an access net common application programming interface (ACAPI) server,
   wherein the terrestrial trunked radio gateway is configured to work as signaling gateway and allow communication between the VoIP phone and a mobile radio terminal, and
   wherein the VoIP phone is configured to use a built-in algebraic codebook excited linear prediction (ACELP) codec to convert voice captured into the ACELP formulated data before transferring to tetra gateway.

2. The terrestrial trunked radio gateway of claim 1, wherein the tetra gateway is further configured to enable a plurality of services to VoIP phone comprising individual call, group call, groups short data service, and individual short data service.

3. The terrestrial trunked radio gateway of claim 1, wherein PCM driver is further configured to extract the algebraic codebook excited linear prediction (ACELP) voice received from the tetra network for the transmission to the VoIP network.

4. The terrestrial trunked radio gateway of claim 1, wherein the ACAPI server is provided on a tetra application platform.

5. The terrestrial trunked radio gateway of claim 1, wherein the access net gateway (AGW) is configured to perform tetra registration, call establishment, and a short data service with the tetra network.

6. The terrestrial trunked radio gateway of claim 1, wherein the user agent server/user agent client (UAS/UAC) is configured to handle VoIP call setup and disconnection.

7. The terrestrial trunked radio gateway of claim 1, wherein the communication protocol between the VoIP phone and the terrestrial trunked radio gateway comprising session initiation protocol (SIP) and real time protocol (RTP).

8. The terrestrial trunked radio gateway of claim 1, wherein the terrestrial trunked radio gateway is configured to convert the session initiation protocol (SIP) from the VoIP phone into the access net common application programming interface (ACAPI) protocol.

9. The terrestrial trunked radio gateway of claim 1, wherein the conference server is configured to store incoming requests from the VoIP phone in queues.

10. The terrestrial trunked radio gateway of claim 1, wherein the built-in algebraic codebook excited linear prediction (ACELP) codec in the VoIP phone configured to increase voice quality at both ends of communication link.

* * * * *